US008543782B2

(12) United States Patent
Fineberg et al.

(10) Patent No.: US 8,543,782 B2
(45) Date of Patent: Sep. 24, 2013

(54) CONTENT-BASED, COMPRESSION-ENHANCING ROUTING IN DISTRIBUTED, DIFFERENTIAL ELECTRONIC-DATA STORAGE SYSTEMS

(75) Inventors: Samuel A. Fineberg, Palo Alto, CA (US); Kave Eshghi, Los Altos, CA (US); Pankaj Mehra, San Jose, CA (US); Mark D. Lillibridge, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2116 days.

(21) Appl. No.: 11/411,467

(22) Filed: Apr. 25, 2006

(65) Prior Publication Data

US 2007/0250670 A1 Oct. 25, 2007

(51) Int. Cl.

| | |
|---|---|
| ***G06F 12/00*** | (2006.01) |
| ***G06F 13/00*** | (2006.01) |
| ***G06F 13/28*** | (2006.01) |
| ***G06F 9/26*** | (2006.01) |
| ***G06F 9/34*** | (2006.01) |

(52) U.S. Cl.
USPC .... 711/161; 711/162; 711/216; 707/999.103; 707/999.204

(58) Field of Classification Search
USPC ............. 711/161, 162, 216; 707/103 R, 204, 707/999.103, 999.204
See application file for complete search history.

(56) References Cited

U.S. PATENT DOCUMENTS

| | | | |
|---|---|---|---|
| 2003/0140051 | A1 | 7/2003 | Fujiwara |
| 2004/0162953 | A1 | 8/2004 | Yoshida |
| 2006/0059173 | A1 | 3/2006 | Hirsch et al. |
| 2006/0059207 | A1 | 3/2006 | Hirsch et al. |

OTHER PUBLICATIONS

A. Muthitacharoen, B. Chen, and D. Mazieres. A Low-Bandwidth Network File System. In Proceedings of the 18th ACM Symposium on Operating Systems Principles (SOSP '01), pp. 174-187, Lake Louise, Alberta, Canada, Oct. 2001.*

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.*

You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.*

* cited by examiner

*Primary Examiner* — Michael Alsip

(57) ABSTRACT

One embodiment of the present invention includes a method for routing a data object, comprising a sequence of data units, to a particular component data-storage system, or particular group of component data-storage systems, within a distributed, differential electronic-data storage system by selecting one or more subsequences of data units from the data object, computing a characteristic value from the selected subsequences, computing an index from the characteristic value; and directing the data object to the particular component data-storage system, or to the particular group component data-storage systems, identified by the computed index.

20 Claims, 10 Drawing Sheets

CONTENT-BASED, COMPRESSION-ENHANCING ROUTING IN DISTRIBUTED, DIFFERENTIAL ELECTRONIC-DATA STORAGE SYSTEMS

TECHNICAL FIELD

The present invention is related to systems for differentially storing data objects and, in particular, to a routing method and routing system for routing a particular data object to one of a number of differential-store component systems for storage.

BACKGROUND OF THE INVENTION

As computer systems and computer-enabled technologies have rapidly evolved during the past 60 years, storage and management of electronic data have become increasingly important for both individuals and organizations. Ever increasing processor speeds, memory capacities, mass-storage-device capacities, and networking bandwidths have provided an ever expanding platform for increasingly complex computer applications that generate ever increasing amounts of electronic data that need to be reliably stored and managed. Recent legislation specifying that certain types of electronic data, including emails and transactional data, need to be reliably stored by certain types of commercial organizations for specified periods of time may further increase electronic-data storage and management needs and requirements.

Initially, electronic data was stored on magnetic tapes or magnetic disks directly controlled by, and accessible to, individual computers. Reliability in data storage was achieved by storing multiple copies of critical electronic data on multiple tapes and/or multiple disks. Electronic data was transferred between computer systems by manually carrying a magnetic tape or magnetic disk pack from one computer system to another. As the importance of high availability data storage systems was recognized, and as computer networking technologies evolved, sophisticated database management systems and independent, network-accessible, multi-port mass-storage devices were developed to allow distributed, interconnected computer systems to manage and share access to highly available and robustly stored electronic data. The ever-increasing volume of electronic data generated by modern computer systems and applications, and increasing automation of office, manufacturing, research, and home environments continue to spur research directed to development of new, more capable electronic-data-storage and electronic-data-management systems.

Recent research and development efforts have been directed to distributed, differential electronic-data storage systems comprising multiple fault-tolerant, relatively autonomous, but highly coordinated and interconnected data-storage-system components that cooperate to efficiently store and manage large volumes of electronic data on behalf of remote host computer systems. The level of data compression achieved in these systems may depend on how data objects distributed across the multiple component data-storage systems, and the throughput of these systems may depend on how quickly and efficiently data-objects can be directed to the one or more component data-storage systems on which they are stored. Developers, manufacturers, and users of distributed, differential electronic-data-storage systems have all recognized the need for improved methods for directing data objects to component data-storage systems within a distributed, differential electronic-data storage system.

SUMMARY OF THE INVENTION

One embodiment of the present invention includes a method for routing a data object, comprising a sequence of data units, to a particular component data-storage system, or particular group of component data-storage systems, within a distributed, differential electronic-data storage system by selecting one or more subsequences of data units from the data object, computing one or more characteristic values from the selected subsequences, computing one or more indexes from the one or more characteristic values; and directing the data object to the particular component data-storage system, or to the particular group of component data-storage systems, identified by the one or more computed indexes.

DETAILED DESCRIPTION OF THE INVENTION

Embodiments of the present invention are directed to routing data objects to individual component data-storage systems within distributed, differential electronic-data storage systems. In these embodiments of the present invention, a data object is routed to a particular component data-storage system based on the data contained in the data object. The routing methods and systems of the present invention attempt to direct similar data objects, collocation of which leads to increased levels of data compression within distributed, differential electronic-data storage systems, to a single component data-storage system, while attempting to relatively evenly distribute dissimilar data objects, or groups of data objects, across all of the component data-storage systems. Certain embodiments of the routing methods and systems of the present invention generate digitally-encoded values from selected portions of the data within a data object, and then select one of the generated digitally-encoded values, or compute a single digitally-encoded value from one or more of the generated digitally-encoded values, to characterize the data object. The selected or computed characteristic value is then used to generate a component-data-storage-system index or address in order to route the data object to a particular component-data-storage-system, or group of component data-storage systems, within a distributed, differential electronic-data storage system.

Figure 1:
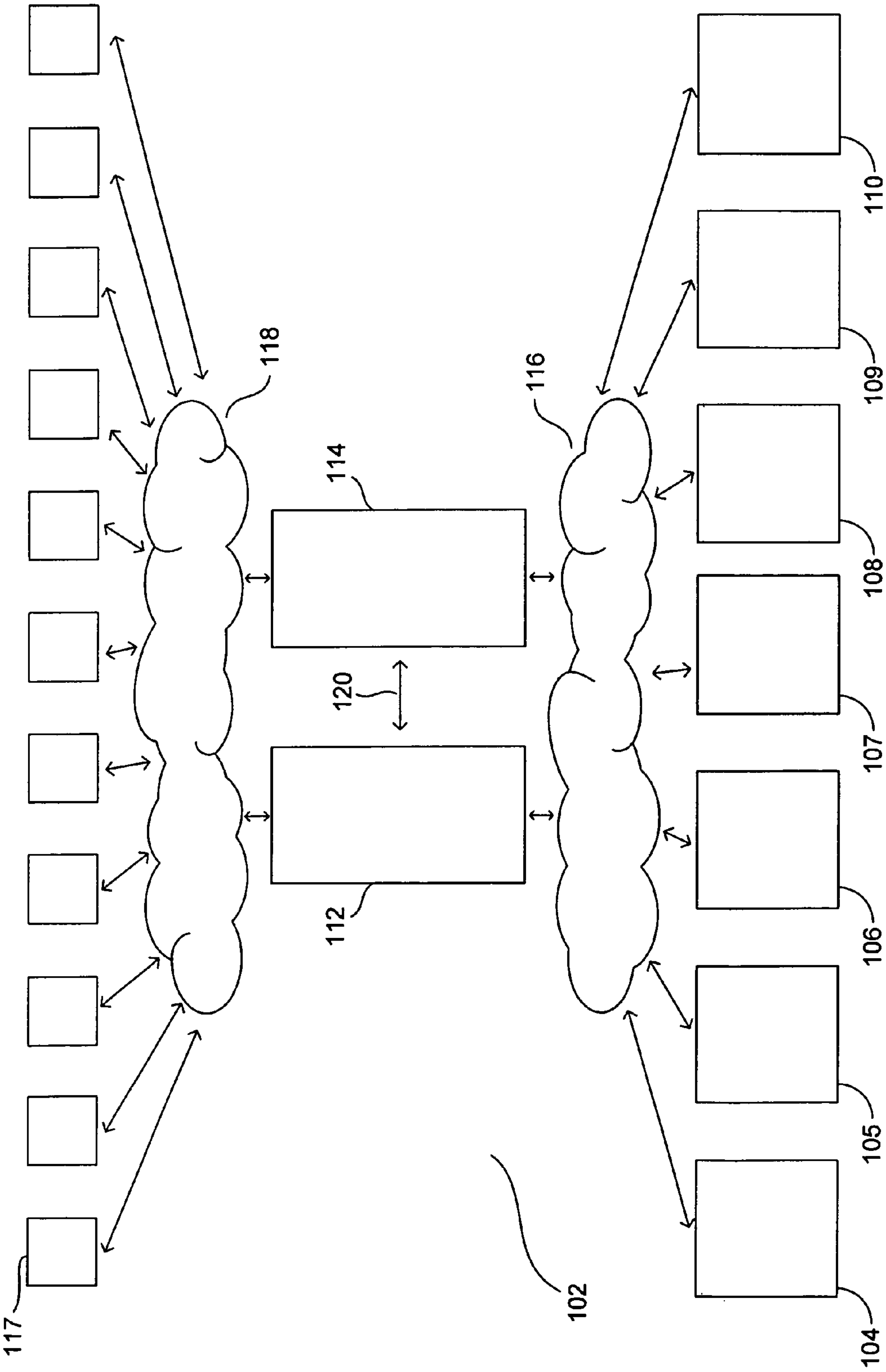
FIG. 1 illustrates a distributed, differential electronic-data storage system in which routing method and system embodiments of the present invention may be employed.

FIG. 1 illustrates a distributed, differential electronic-data storage system in which routing method and system embodiments of the present invention may be employed. The exemplary distributed, differential electronic-data storage system 102 includes a number of component data-storage systems 104-110 that are interconnected with one another and with a number of portal computer systems 112 and 114 via a first communications medium 116. The portal computer systems 112 and 114 are, in turn, interconnected with a large number of host computer systems, such as host computer system 117, through a second communications medium 118. The portal computer systems 112 and 114 may be directly interconnected by a communications medium 120 and/or by the first or second communications media 116 and 118. The host computer systems, such as host computer system 117, transmit data objects to a portal computer (112 and 114) for storage within the distributed, differential electronic-data storage system. The host computers can subsequently retrieve stored data objects from the distributed, differential electronic-data storage system by transmitting retrieval requests to a portal computer (112 and 114). The portal computers (112 and 114) are responsible for directing data objects and retrieval requests to the appropriate component data-storage systems.

An essentially limitless number of different implementations of distributed, differential electronic-data storage systems can be devised. In certain of these implementations, the component data-storage systems may directly communicate with host-computer systems, obviating the need for portal computers. In other implementations, portal computers and component data-storage systems may be hierarchically interconnected. Component data-storage systems may be implemented on any number of different hardware and software platforms, and may include multiple processing components and two-way mirroring or higher degrees of physical data redundancy in order to store data with high reliability and high availability. The data-object routing method and systems of the present invention are applicable to any of the essentially limitless number of different distributed, differential electronic-data storage systems that may be implemented.

A data-storage system may be classified as a differential data-storage system when the total volume of data stored within the data-storage system is less than the total volume of data submitted to the storage system for storage. For example, if an original document of length 500 kilobytes and a revised version of the original document of length 600 kilobytes, in which the first 500 kilobytes are identical to the 500 kilobytes of the original document, are both submitted to a differential storage system, the differential storage system may store only the 500 kilobytes of the original document and the 100 kilobytes appended to the original document, or difference, to generate the revised document, along with a very small amount of additional information needed to reconstruct the revised document from the stored original document and stored difference. Thus, rather than storing 1.1 megabytes, the sum of the sizes of the original document and revised document, the differential storage system may store only 600 kilobytes along with some small additional data overhead. Differential electronic-data storage systems may employ any of a wide variety of different types of redundancy-detecting and redundancy-eliminating methods and systems, including a wide variety of compression methods, in order to efficiently store data objects.

In one class of distributed, differential electronic-data storage systems, each data object submitted to the system for storage is directed to, and stored within, a single component data-storage system of the distributed, differential electronic-data storage system. In alternative system, the data object may be directed to a single, hierarchically arranged group of component data-storage systems. This class of systems exhibits certain advantages, including minimal impact of failed component electronic-data-storage systems and efficient deletion of data objects from the distributed, differential electronic-data storage system. In this class of distributed, differential electronic-data storage systems, routing of data objects to particular electronic-data-storage-system components can determine the level of data compression achieved by the distributed, differential electronic-data storage system and can also impact the overall data-storage efficiency of the distributed, differential electronic-data storage system.

Figure 2:
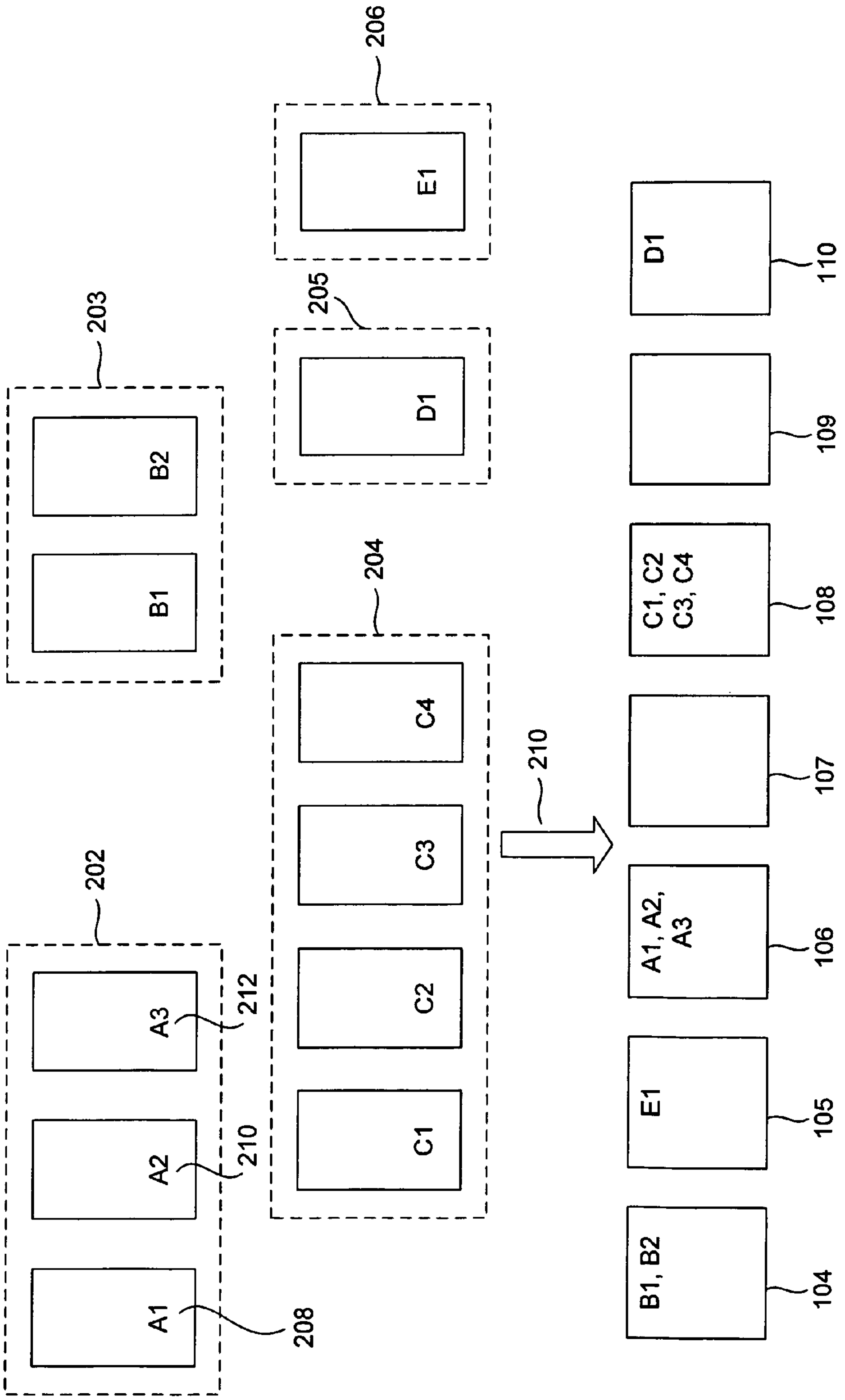
FIG. 2 illustrates several desired properties for routing data objects to individual electronic-data-storage components within a distributed, differential electronic-data storage system that represent embodiments of the present invention.

FIG. 2 illustrates several desired properties for routing data objects to individual component data-storage systems or particular groups of component data-storage systems within a distributed, differential electronic-data storage system that represent embodiments of the present invention. In FIG. 2, five groups 202-206 of related, or similar, data objects are shown within dashed rectangles. For example, the first data-object group 202 includes the three data objects A1 208, A2 210, and A3 212. The data objects within each group are likely to be similar, or, in other words, likely to share a certain amount of data, and are therefore compressible when stored together or successively stored on a particular component data-storage system, while the data objects within one group are likely to be dissimilar with respect to the data objects in the other groups, and unlikely to offer significant opportunities for data compression by virtue of being stored together. For example, a component data-storage system can generally store similar data objects A1, A2, and A3 in less data-storage space than the sum of the data-storage spaces needed to individually store data objects A1, A2, and A3. However, a component data-storage system generally stores dissimilar data objects A1 and B1 using a data-storage space approximately equal to the data-storage spaces needed to individually store data objects A1 and B1. Therefore, in the class of distributed, differential electronic-data storage systems in which entire data objects are stored within individual component data-storage systems or groups of component data-storage systems, the greatest level of compression, or removal of data redundancy, can be achieved when similar data objects are collocated within individual component data-storage systems or particular groups of component data-storage systems.

In FIG. 2, the arrow 210 represents routing of data objects to individual component data-storage systems 104-110. For greatest overall data compression, as shown in FIG. 2, the routing method 210 directs each data object within a group of similar data objects to a single component data-storage system. For example, all of the data objects A1, A2, and A3 in the first group of similar data objects 202 are routed to component data-storage system 106.

While routing of similar data objects to the same component data-storage system is desirable for maximizing the data compression of a distributed, differential electronic-data storage system, overall data-storage efficiency is increased by relatively uniformly distributing data objects across all of the component data-storage systems. In other words, when each component data-storage system stores an approximately equal volume of data, the overall storage capacity of the distributed, differential electronic-data storage system can be most efficiently used. Otherwise, certain of the component data-storage systems may be filled to maximum capacity while other of the component data-storage systems may remain idle, requiring expensive data redistribution operations or equally expensive and inefficient addition of additional component data-storage systems in order to increase capacity of the distributed, differential electronic-data storage system, even though certain of the component data-storage systems are not storing data. Thus, as shown in FIG. 2, a desirable routing method and system 210 spreads the different, dissimilar groups of data objects 202-206 relatively uniformly across the component data-storage systems 104-110.

In many distributed, differential electronic-data storage systems, it is not necessary that all similar data objects are successfully routed to a single component data-storage system, and it is also not necessary that data be stored in a way that guarantees absolute, uniform distribution of data across all the component data-storage systems. Instead, quality of routing may range from random assignment of data objects to component data-storage systems, regardless of similarity between data objects to ideal collocation of all similar data objects, and may range from non-uniform distribution of data within a distributed data-storage system to an ideal, uniform distribution in which each component data-storage system stores the same volume of data, within the granularity of a minimum data object size. In general, as with most computational systems, there are processing-overhead, communications-overhead, and memory-usage tradeoffs among various approaches to routing, and the closer a routing system approaches ideal uniform data distribution and ideal similar-data-object collocation, the greater amount of processing, memory, and communications resources that may be needed to execute the routing system. In many cases, it is desirable to somewhat relax distribution and collocation requirements in order to increase the speed and efficiency by which data objects are routed. The various embodiments of the present invention represent a favorable balance between routing speed and computational efficiency versus uniformity of data distribution and the degree to which similar data objects are collocated.

It should be noted that, in general, data objects are supplied to a distributed, differential electronic-data storage system serially, one-by-one, so that the distributed, differential electronic-data storage system needs to route data objects to component data-storage systems without the benefit of global information with respect to the data objects that are eventually stored within the distributed, differential electronic-data storage system. Moreover, as additional data objects are stored, and already stored data objects are deleted, the data state of a distributed, differential electronic-data storage system varies dynamically, often in a relatively unpredictable fashion. Therefore, strategies for routing data to achieve uniformity of data distribution and collocation of similar data objects are often unavoidably non-optimal. Furthermore, because routing may represent a significant bottleneck with respect to data-object exchange between a distributed, differential electronic-data storage system and accessing host computer systems, router efficiency and routing speed may be limiting factors in overall system performance. It should also be noted that data-object similarity may be measured in many different ways, subgroups of which are relevant to different compression techniques and differential-store strategies employed by different distributed, differential electronic-data storage systems. The method and system embodiments of the present invention assume the similarity between two data-objects to be correlated with the number of identical, shared subsequences of data units contained within the two data objects.

Figure 3:
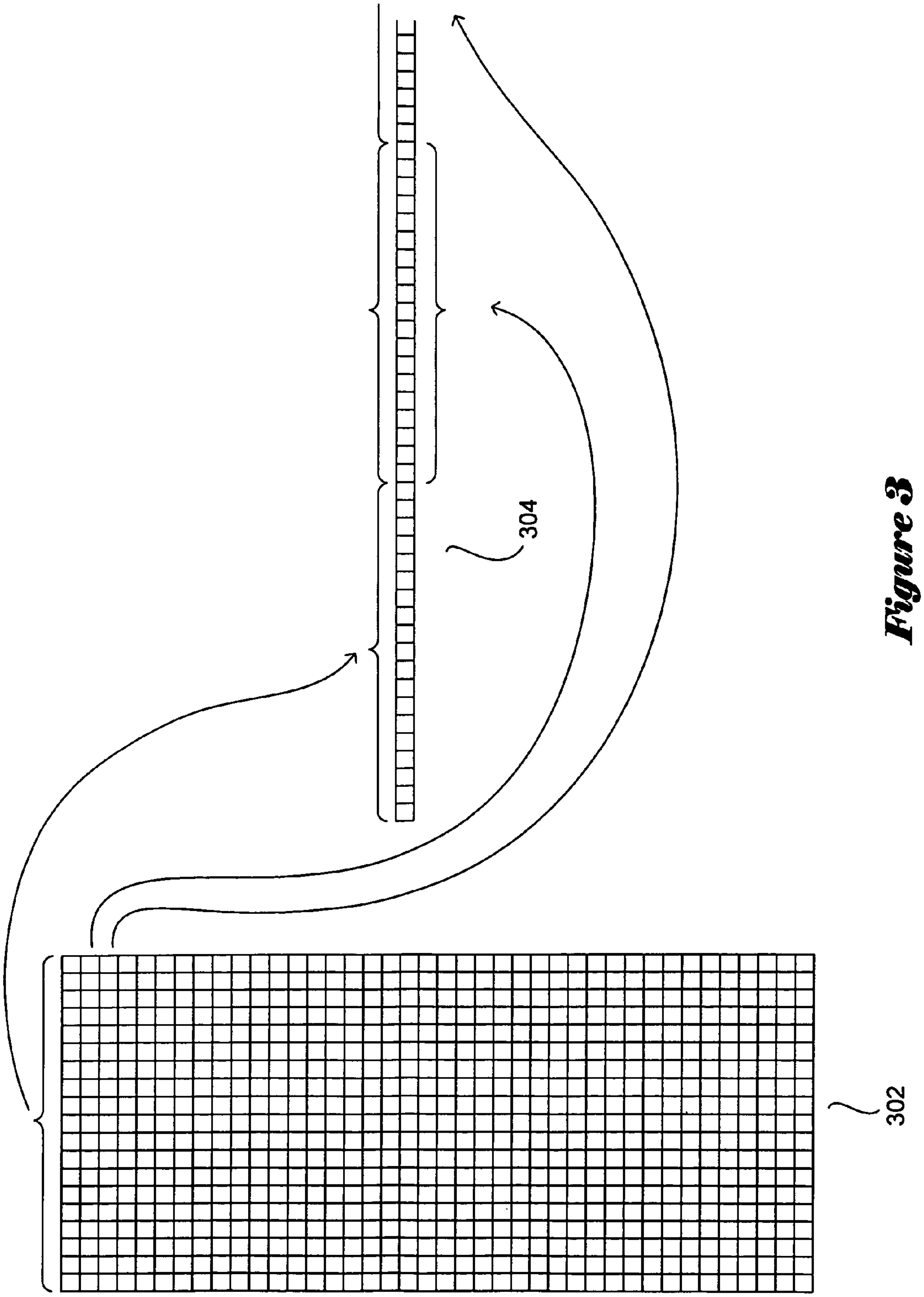
FIG. 3 illustrates a generalized data object routed by method and system embodiments of the present invention.

FIG. 3 illustrates a generalized data object routed by method and system embodiments of the present invention. As shown in FIG. 3, a data object 302 is often considered to be a two-dimensional array of data units. Types of data objects that fit this conceptualization include text documents, digitally encoded photographs, various types of computer-generated data, digitally encoded software programs and executable files, and many other types of data objects. Such data objects can be alternatively viewed as a single, very long, linear array 304 of ordered data units, with the order of data units in the array 304 determined by a deterministic mapping function that maps the two-dimensional array of data units to a single, linear array of data units, and, in fact, are normally stored and manipulated in this fashion by computer hardware and software. For example, as shown in FIG. 3, the lines of a text file may be successively stored in the linear array, line-by-line, to generate a single sequential array of text symbols. In general, regardless of the logical topology of a data object, a data object can be mapped to a single, sequentially ordered, linear array of data units. Data units may include bytes, 16-bit characters, 32-bit integers, or any other convenient primitive data unit into which a data object can be decomposed.

Figure 4A:
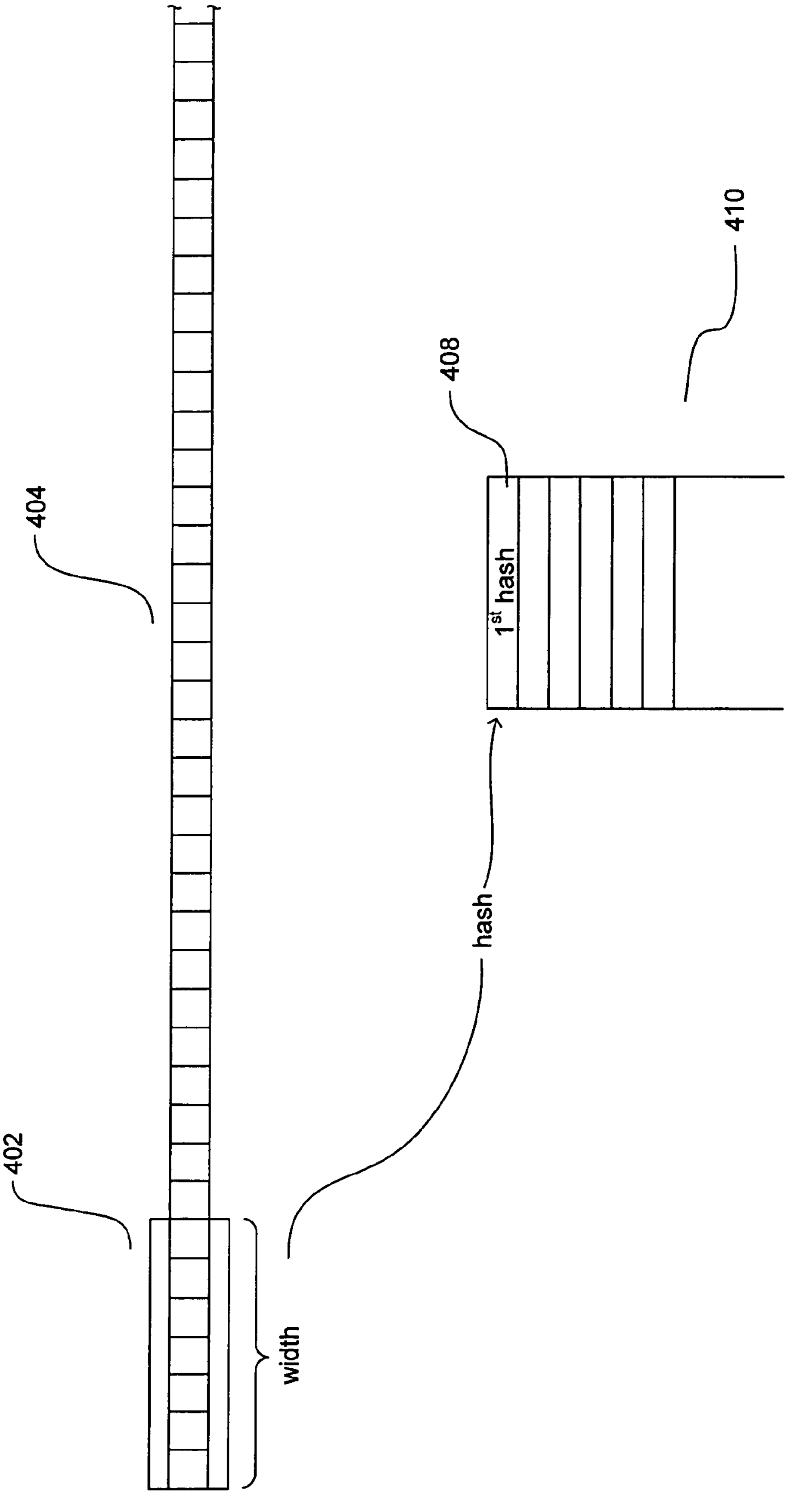
FIGS. 4A-D illustrate a general routing-method embodiment of the present invention.

Assuming data objects to be sequentially ordered, linear arrays of data units, method and system embodiments of the present invention process the data objects in order to first generate a digitally-encoded value, such as a large integer, that is generally much smaller than the data object, in order to represent or characterize the data object. Then, in a second step, method and system embodiments of the present invention, typically using modulo arithmetic, generate a component data-system index or address for directing the data object represented or characterized by the digitally encoded value to a particular component data-storage system or group of data-storage systems. FIGS. 4A-D illustrate a general routing-method embodiment of the present invention. As shown in FIG. 4A, a relatively small window 402 of successive data units within the linear array representing the data object 404, generally left-justified with the first data unit in the array 404, is first considered. The window has, in many embodiments, a fixed width. For example, in FIG. 4A, the window 402 has a width of seven data units. A procedure or function is used to generate a digitally-encoded value based on the data-unit contents of the window. In general, such functions are referred to as hash functions 406. Hash functions generate the same, unique number for each instance of a window containing identical data-unit values or is, in other words, repeatably deterministic. The hash values generated for two data windows containing one or more different data-unit values are generally different. However, viewing the contents of the data window as encoding a large binary number, since the larger number of possible data-window values are mapped to a smaller number of possible hash values, hash functions unavoidably produce collisions in which two windows containing differently valued data units generate the same hash value. There are many different types of hash functions with different distribution characteristics. These classes of hash functions may be more or less useful for data-object routing within distributed, differential electronic-data storage systems depending on expected distributions of, and types of, data objects stored within the systems. Selection of hash functions appropriate for particular data-object-routing problems is beyond the scope of the present application. Once a hash value has been generated 406 from the data-unit contents of the data window 402, the hash value is stored in a first entry 408 of an array of hash values 410.

Figure 4B:
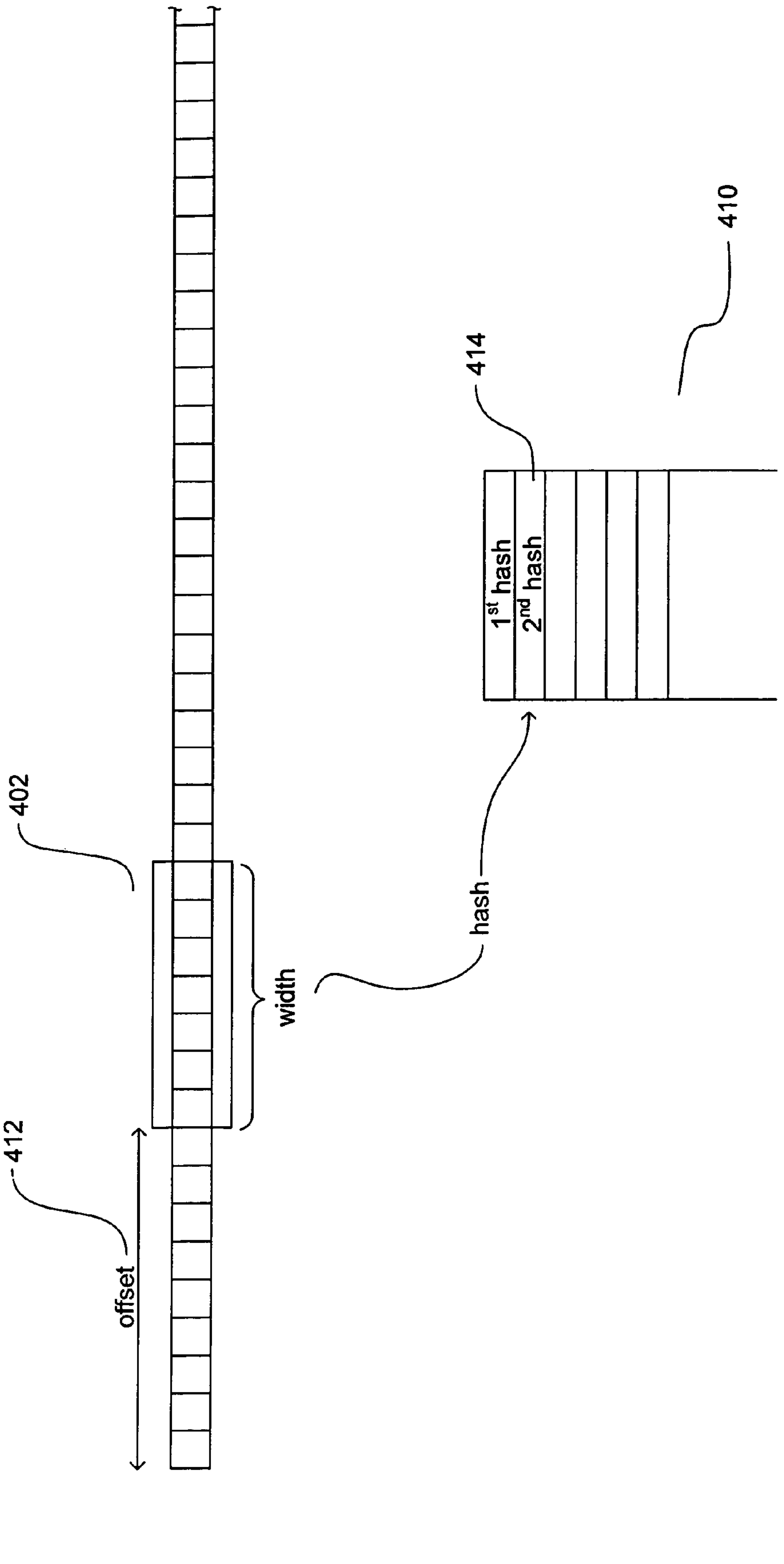
Figure 4C:
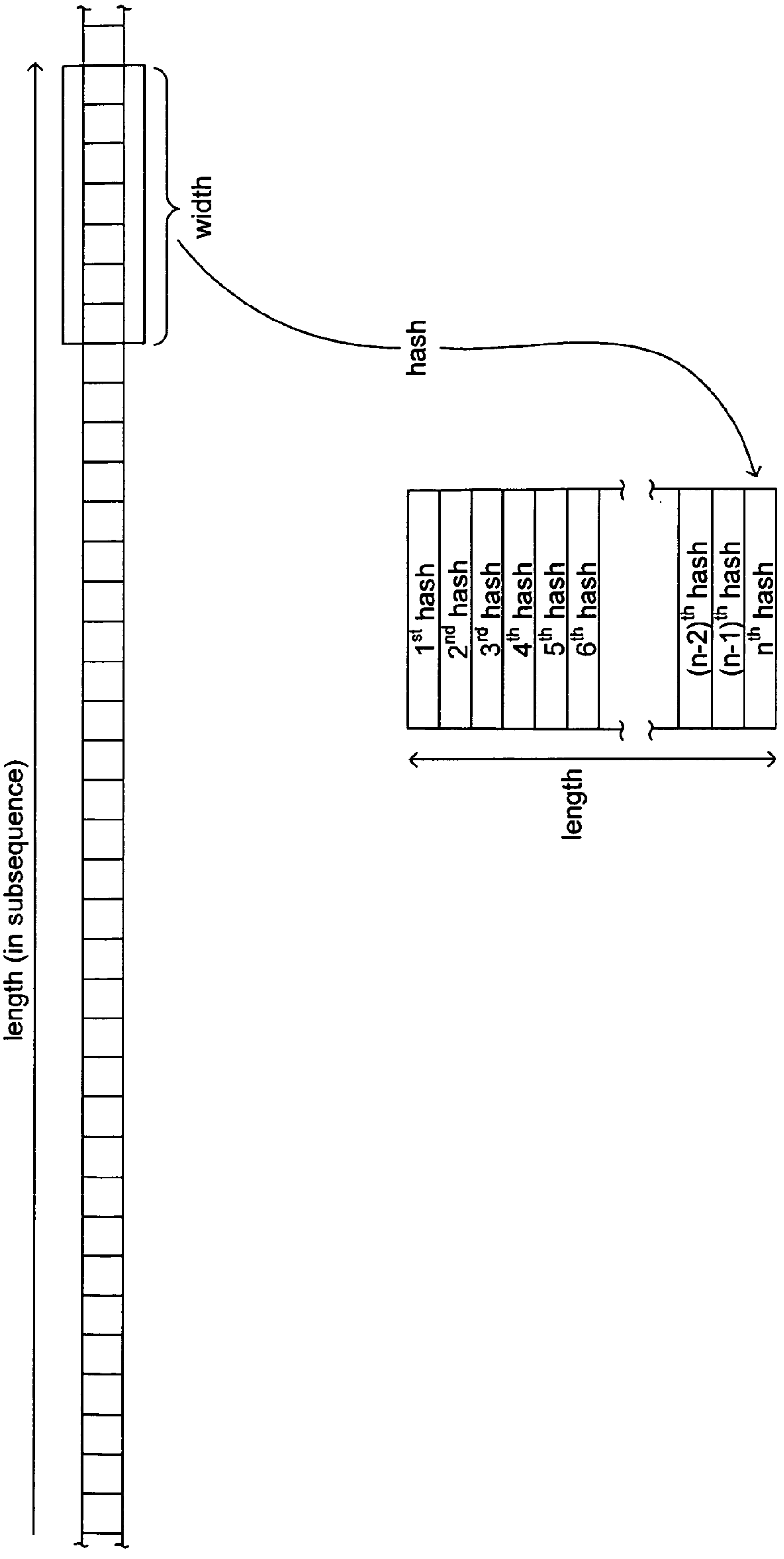

Next, as shown in FIG. 4B, the window 402 is displaced from the initial position of the window, shown in FIG. 4A, by some number of data units referred to as an offset 412. The new data-unit contents of the data window, following displacement of the data unit by the offset, are provided to the hash function to generate a second hash value which is stored in the second entry 414 of the array of hash values 410. The process of displacing the window by the offset and computing a next hash value continues until a number of hash values, referred to as the "length," have been generated, as shown in FIG. 4C. The length may be measured either in terms of the number of hash values generated, or in terms of the number of data units traversed in the window-displacement and hash-value-computation method illustrated in FIGS. 4A-C. The length may be equal to the total possible number of hash-value-generation steps over the linear-array representation of the data object, or may be a smaller number. It should be noted that the specific offset and width shown in FIG. 4B would not be used in many embodiments of the present invention. The width and offset shown in FIG. 4B are used for clarity of illustration only. However, a wide variety of different widths and offsets may be suitable for various applications of the present invention to specific problems, including the offset and width used in FIG. 4B. In certain embodiments, the data contained within a window, such as window 402 in FIG. 4B, is referred to as a chunk, particularly when the offset is equal to, or larger than, the width, so that windows do not overlap with one another.

Figure 4D:
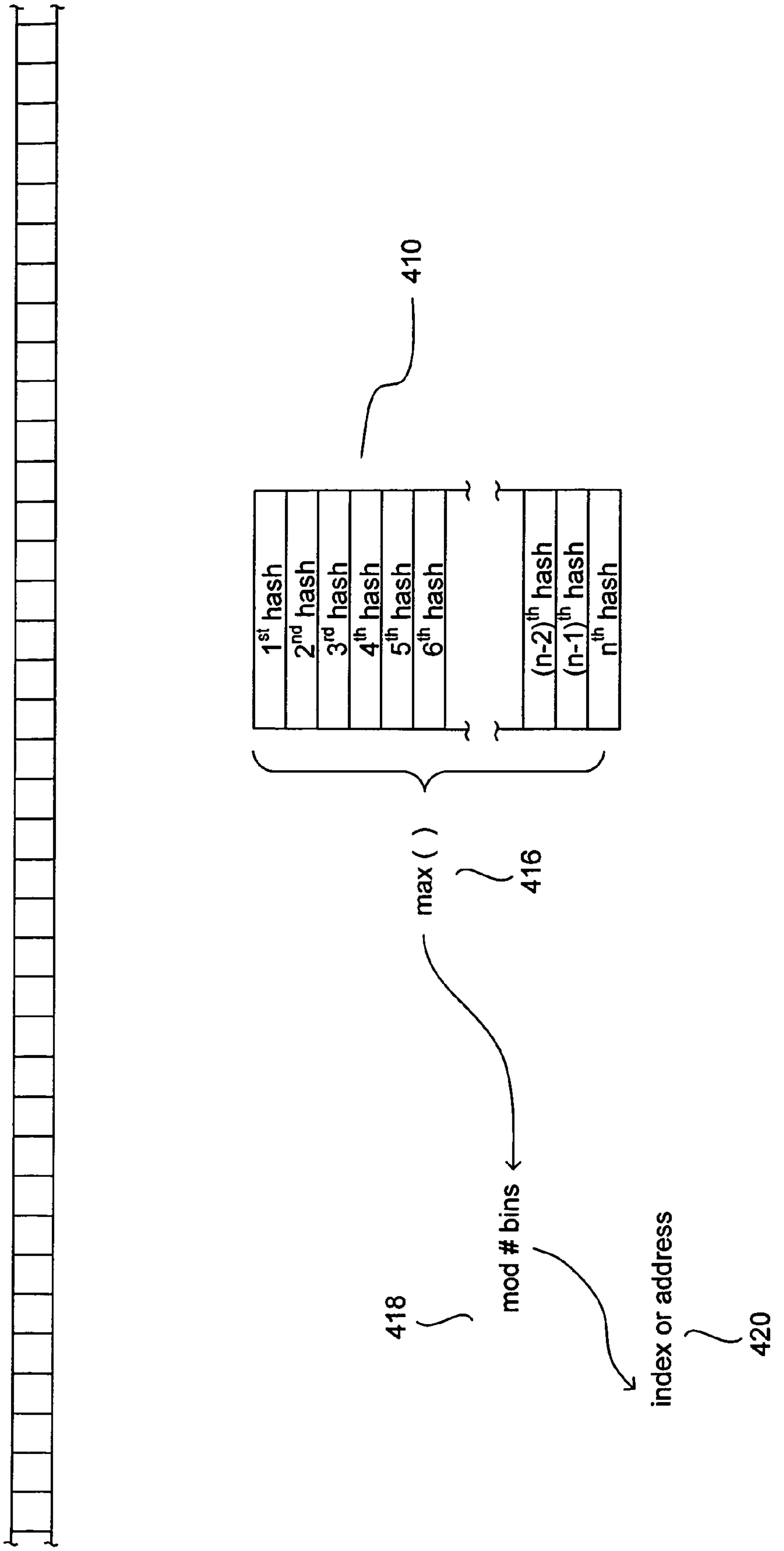

Next, as shown in FIG. 4D, a function 416 is used to select a number k of the hash values from the hash-value array 410, and the selected k hash values are then used in an arithmetic operation 418 to generate the index or address of a component data-storage system 420. In the example shown in FIG. 4D, the function used to select k hash values from the array of hash values is the max( ) function, which selects k hash values with largest numerical values. Alternatively, the k smallest valued hash values may be selected in alternative embodiments, or a function that arithmetically computes a single characteristic value based on two or more hash values stored in the hash-value array and selected by a deterministic process may also be used in alternative implementations. In the example shown in FIG. 4D, the k hash values are combined to form a single integer, or characteristic value, and the remainder of integer division of the characteristic value by the number of component data-storage systems is used to generate a component data-storage-system index. In alternative embodiments, any of an almost limitless number of different deterministic mappings between computed values or hash values to component data-storage-system addresses or indexes may be employed. In certain embodiments, for example, multiple characteristic values may each be computed from between 1 and k hash values, and the characteristic values may then be used in a subsequent calculation of a component data-storage system address. In other embodiments, two or more component data-storage systems addresses may be generated, to allow a data object to be stored on multiple component data-storage systems.

Figure 5:
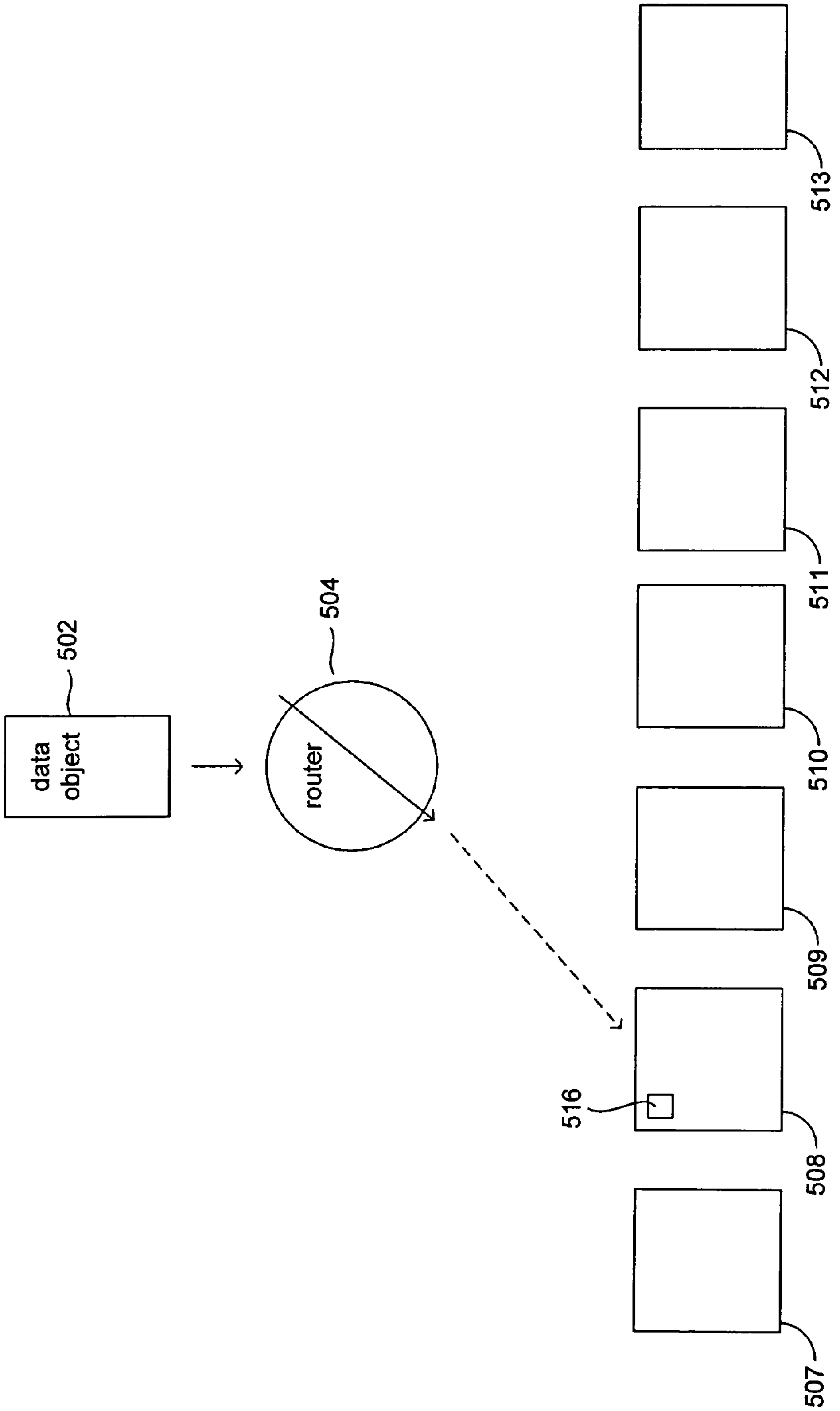
FIG. 5 abstractly illustrates data-object routing by methods of the present invention.

FIG. 5 abstractly illustrates data-object routing by methods of the present invention. A data object 502 is processed by the routing method of the present invention 504, as discussed above with reference to FIGS. 4A-B, to generate a component data-storage system address or index in order to direct the data object 502 to a particular component data-storage system 508 from among all of the component data-storage systems 507-513 that together compose a distributed, differential electronic-data storage system. Alternatively, the index or address may be used to direct the data object to a particular group of hierarchically arranged component data-storage systems. The data object 502 is then transmitted to the selected component data-storage system 508 for storage 516.

The generalized routing method discussed above with reference to FIGS. 4A-D is characterized by three different parameters: (1) width, the width of the window of data units used to generate each hash value; (2) offset, the number of data units by which successive window placements are displaced from one another within the linear array of data units that represent the data object for successive hash-value computations; and (3) length, the number of hash values generated from which a characteristic value is selected or computed. In many embodiments of the present invention, these three characteristics, or parameters, have fixed values. However, in alternative embodiments and implementations, any one or more of the parameters may have regularly varying values. For example, the offset could be increased by a fixed amount after generation of each hash value. In another example, the length may vary with the size of the data object, so that up to a length number of hash values is generated for each data object. In yet another example, the window size may regularly vary as hash values are generated.

Figure 6A:
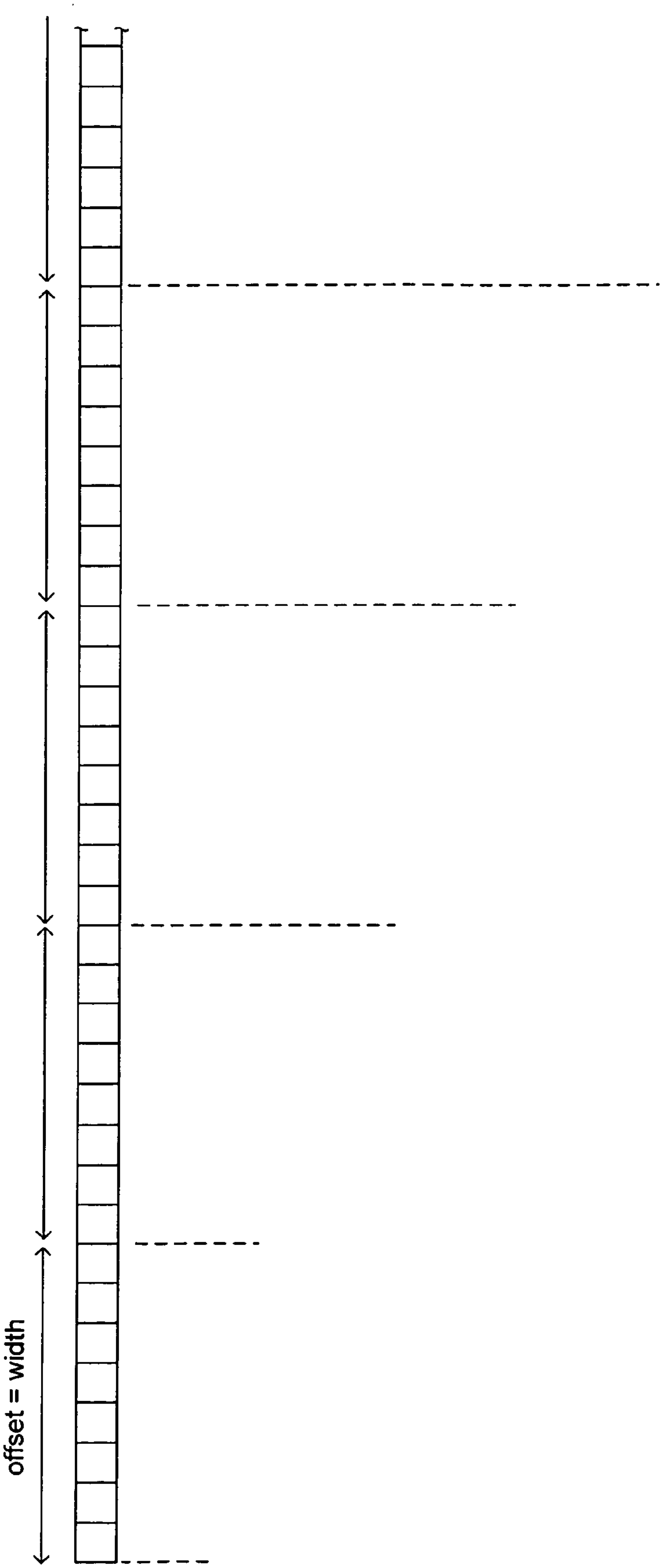
FIGS. 6A-B illustrate two different routing methods of the present invention that represent special cases of the general routing method discussed above with reference to FIGS. 4A-D.
Figure 6B:
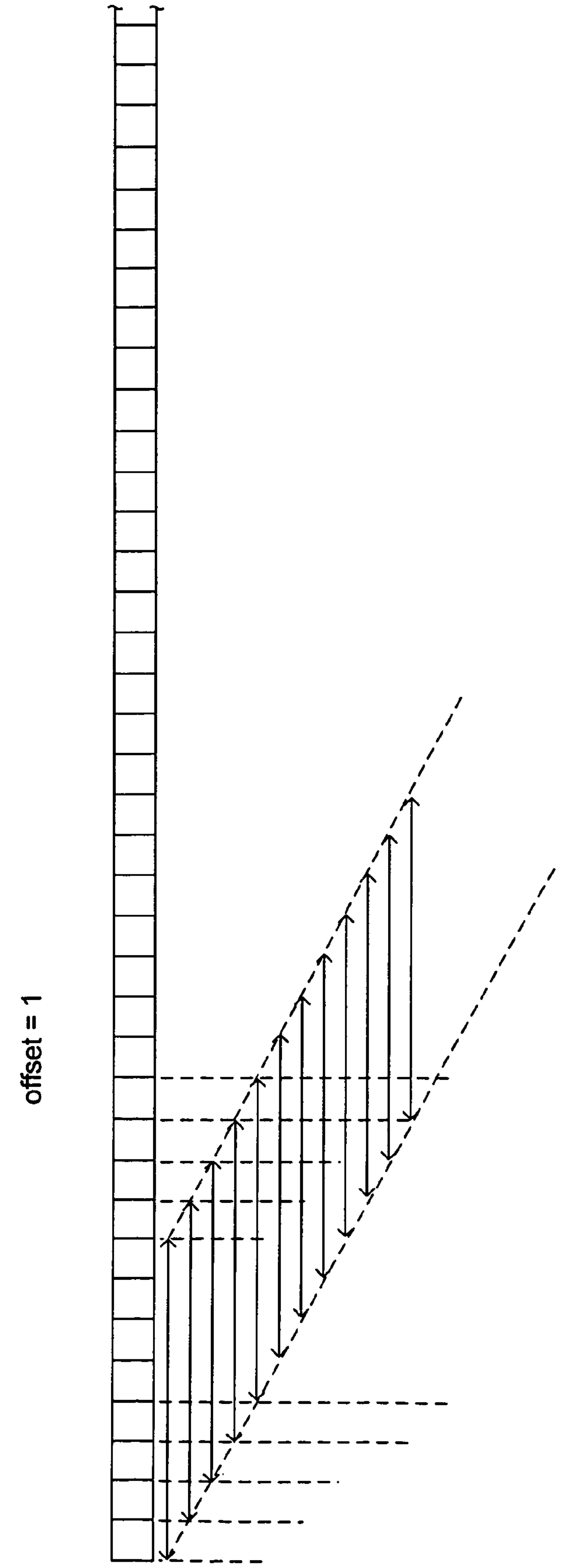

Two particular routing schemes, representing particular fixed parameter values, are of particular interest. FIGS. 6A-B illustrate two different routing methods of the present invention that represent special cases of the general routing method discussed above with reference to FIGS. 4A-D. FIG. 6A shows the max-chunk method. In the max-chunk method, offset is equal in value to width, so that the successive windows form a series of consecutive chunks along the linear-array representation of the data object. In this method, the maximum hash value generated from any particular chunk may be selected as the value characteristic of the data object, and a component data-storage address may be computed based on this maximum hash value. Alternatively, the minimum hash value may be selected, or some other value may be computed from the hash values generated from the chunks.

FIG. 6B illustrates the n-gram routing method. In the n-gram routing method, offset is equal to “1.” Thus, hash values are generated for each successive window displaced from the preceding window by one data unit. The n data-units within each window, where n is equal to the width of the window, are considered to be an n gram, and the n-gram hash therefore computes a characteristic value based on examining all possible N grams within the data object.

Next, a simple C++-like pseudocode implementation of the general routing method discussed above with reference to FIGS. 4A-D is provided. First, several type definitions and constant values are declared:

```
1 typedef X hashValue;
2 const hashValue MAX_HASH = Z;
3 typedef unsigned char byte;
4 const int MaxWidth;
```

The type definition “hashValue” defines a data type for storing computed hash values. This data type may be, for example, a 32-bit integer, an array of bytes representing a longer digitally-encoded integer, or some other convenient language-supplied data unit. The chosen language-supplied data type is inserted in place of the letter X in the above type definition. The constant value “MAX_HASH,” declared above on line 2, represents the maximum valued integer that can be stored in n instance of the data type “hashValue.” An integer appropriate for the data type hashValue would be inserted in place of the letter Z in the above constant declaration. The type “byte,” declared above on line 3, represents the assumed data unit for data objects. Any convenient data unit can be chosen in alternative implementations. The constant “MaxWidth,” declared above on line 4, is the maximum number of data units that may occur in a window, the maximum value for the above-discussed parameter width, or, in other words, the maximum window size.

Next, a declaration for the abstract class “object” is provided:

```
class object
{
  public:
      virtual bool open( ) = 0;
      virtual bool getNextSubSeq(byte* subSeq, int skip, int len) = 0;
      virtual void close( ) = 0;
};
```

An instance of the class "object" is a data object that is routed by the routing method that represents one embodiment of the present invention. The class "object" includes three virtual function members: (1) "open," which prepares the object for access; (2) "getNextSubSeq," which skips over a number of data units specified by the argument "skip" before successively accessing a number of data units specified by the argument "len," placing the accessed data units into the data-unit array referenced by the argument "subSeq"; and (3) "close," which closes the data object. The function member "getNextSubSeq" pads the contents of the data-unit array "subSeq" with zeros, or another arbitrary data-unit value in alternative embodiments, if there are insufficient data units in the data object to access and store the number of data units specified by the argument "len" into the data-unit array "subSeq." This padding only occurs for the first call to the function member "getNextSubSeq" following a call to the function member "open." For all additional calls, if there are not a number of data units specified by the argument "ten" remaining in the data object, the call fails and the Boolean value FALSE is returned. If "len" data units remain in the data object and are successfully accessed, or function member "getNextSubSeq" is being called for the first time following a call to the function member "open," then the Boolean value TRUE is returned, unless some other error condition specific to a certain type of data object occurs.

Different data-object classes that inherit from the class "object," discussed above, can be developed for different types of data objects. For example, a class for file objects is declared below:

```
class fileObject : public virtual object
{
  private:
      FILE *fl;
      char* flName;
      int numSubSequencesFetched;

  public:
      bool open( );
      int getNumBytes( );
      bool getNextSubSeq(byte* subSeq, int skip, int len);
      void close( );
      fileObject(char* name);
};
```

Finally, the class "router" is declared, below, each instance of which represents a routing object that routes data objects according to the general method discussed above with reference to FIGS. 4A-D.

```
class router
{
  private:
      int wid;
      byte nextSubSeq[MaxWidth};
      hashValue hashNextSubSeq( );
```

-continued

```

  public:
      int bin(object* obj, int width, int length, int offset, int
      numBins);
};
```

The class "router" includes the following private members: (1) the data member "wid," which stores the width of the window, or the parameter width discussed above; (2) the data member "nextSubSeq," an array of data units storing the data units of the next window from which a hash value is to be generated; and (3) the function member "hashNextSubSeq," which generates a hash value from the current contents of the above-described array "nextSubSeq." The class "router" includes a single public function member "bin," to which is supplied, as arguments, the width, length, and offset parameters discussed above with reference to FIGS. 4A-D, the number of bins, or component data-storage systems to which an object can be routed, "numBins," and a pointer to a data object, "obj," that is to be routed according to a method embodiment of the present invention. The public function member "bin" computes the index of a component data-storage system, or bin, to which the object referenced by the pointer argument "obj" is directed according to embodiments of the present invention.

As discussed above, any of an almost limitless number of different hash functions can be selected and implemented for use in embodiments of the present invention. A specific implementation of the private function member "hashNextSubSeq" is therefore not provided. Hash functions are well studied and well known to those skilled in the art of computer programming and computer science. Next, an implementation of the function member "bin" of the class "router," which implements the general routing method discussed above with reference to FIGS. 4A-D, is provided:

```
int router::bin(object* obj, int width, int length, int offset, int numBins)
{
  int subSeqOverlap;
  hashValue max = 0;
  hashValue tmp;
  int i, j, fetch, skip;

  if ((!obj−>open( )) ||
       (length < 1) ||
       (width < 1) ||
       (width > MaxWidth) ||
       (offset < 1) ||
       (numBins < 1))
  {
       obj−>close( );
       return −1;
  }

  wid = width;
  subSeqOverlap = width − offset;
  if (subSeqOverlap < 0) subSeqOverlap = 0;
  fetch = width − subSeqOverlap;
  if (offset > fetch) skip = offset − fetch;
  else skip = 0;

  if (!obj−>getNextSubSeq(nextSubSeq, 0, width))
  {
       obj−>close( );
       return −1;
  }

  while (−−length)
  {
```

-continued

```
34         tmp = hashNextSubSeq( );
35         if (tmp > max) max = tmp;
36         for (i = 0, j = offset; i < subSeqOverlap; i++, j++)
37               nextSubSeq[i] = nextSubSeq[j];
38         if (!obj->getNextSubSeq(&(nextSubSeq[i]), skip, fetch)) break;
39   }
40
41   obj->close( );
42   return (max % numBins);
43 }
```

First, on lines 3-6, a number of local variables are declared. The variable "subSeqOverlap," declared above on line 3, stores the amount of overlap, in data units, between successive windows. The variable "max," declared above on line 4, stores the maximum hash value so far computed for the data object. The variable "tmp," declared above on line 5, stores the most recently computed hash value. The variables "i" and "j," declared on line 6, are loop control variables. The variable "fetch," also declared on line 6, stores the number of data units to next fetch from the data object in order to generate the next window from which a hash is computed. The variable "skip," also declared on line 6, stores the number of data units to pass over before retrieving data units for the next window.

On lines 8-17, the supplied data object is opened, and various error conditions related to the supplied arguments are tested. If the open fails, or any of the supplied arguments have incorrect values, then the object is closed, on line 15, and an error return value of−1 is returned on line 16. Next, on lines 19-24, the supplied window width is stored in the data member "wid," and the overlap, fetch, and skip values are computed. Then, on lines 26-30, the first window is generated by fetching a number of data units equal to the parameter width from the data object and stores the data units in the data member array "nextSubSeq." In the first window, no data units are skipped before data units are retrieved from the data object and, as discussed above, if there are an insufficient number of data units within the data object to generate the first window, the first window is padded with zero characters or some other arbitrary character or data-unit value. Next, in the while-loop of lines 32-39, a hash value is generated from the current contents of the data member "nextSubSeq," on line 34, and if this hash value is greater than any hash value yet computed, the hash value is stored in local variable "max," on line 35. Then, in the for-loop of lines 36-37, those characters that are overlapped by the next window are moved within the current window to left justify the overlapped characters in the current window and, on line 38, a sufficient number of data units is fetched from the data object to complete the next window. The while-loop of lines 32-39 iterates until either a number of hash values equal to the parameter "length" are generated, or until a call to "getNextSubSeq" fails. The data object is then closed, on line 41, and a component data-storage system index, or bin, is generated as the remainder of integer division, on line 42.

The above C++-like pseudocode implements a fixed-parameter-value, general routing method as discussed above with reference to FIGS. 4A-D. As also discussed above, an almost limitless number of alternative implementations may be devised, using different control structures, programming languages, data structures, modular organizations, and other programming characteristics. Moreover, a routing method may be implemented in software, in logic circuits, or in some combination of software of logic circuits of various different systems.

The family of specific routing methods included in the general routing method discussed with reference to FIGS. 4A-D can be argued to probabilistically direct similar data objects to the same component data-storage system or group of component data-storage systems. For example, consider the n-gram routing method discussed with reference to FIG. 6B. Let $G_1$ be the set of all n grams in a first data object $DO_1$, and $G_2$ be the set of all n grams in a first data object $DO_2$. A similarity metric can be defined as:

$$sim(G_1, G_2) = \frac{|G_1 \cap G_2|}{|G_1 \cup G_2|}$$

The similarity metric defines similarity to be the ratio of shared subsequences to total subsequences for the two data objects. Let $S_1$ be the set of hash values generated from the n grams $G_1$, and $S_2$ be the set of has values generated from the set of n grams $G_2$. When the hash function used to generate the n grams does not produce too many collisions, the value of the similarity metric can be estimated from the generated hash values $S_1$ and $S_2$ as follows:

$$sim(G_1, G_2) = \frac{|G_1 \cap G_2|}{|G_1 \cup G_2|} \approx \frac{|S_1 \cap S_2|}{|S_1 \cup S_2|}$$

It can then be shown that:

$$Prob(\max(S_1) = \max(S_2)) = \frac{|S_1 \cap S_2|}{|S_1 \cup S_2|} = sim(G_1, G_2)$$

Moreover, the probability that the two similar objects $DO_1$, and $DO_2$ will be directed to the same bin by the above-described routing method of the present invention is greater than the probability that the maximum hash values generated for the two objects are identical. However, the probability that the two dissimilar objects $DO_3$ and $DO_4$ will be directed to the same bin by the above-described routing method can be estimated as:

$$\frac{|S_1 \cap S_2|}{|S_1 \cup S_2|} \approx \frac{1}{n}$$

Therefore, the n-gram routing method has a high probability of routing similar data objects to the same bin, or component data-storage system, and a relatively low probability of routing dissimilar data objects to the same bin, instead relatively uniformly distributing dissimilar data objects across the component data-storage systems that together compose a distributed, differential electronic-data storage system. The family of routing methods discussed with reference to FIGS. 4A-D, representing various embodiments of the present invention, thus provides the desired properties discussed with reference to FIG. 3, and are also computationally efficient. Finally, the family of routing methods discussed with reference to FIGS. 4A-D, representing various embodiments of the present invention, use only the data content of data objects for routing, providing a deterministic routing of data objects that is not dependent on additional data, rules, and considerations stored within components of the distributed, differential electronic-data storage system.

Although the present invention has been described in terms of a particular embodiment, it is not intended that the invention be limited to this embodiment. Modifications within the spirit of the invention will be apparent to those skilled in the art. For example, as discussed above, one or more of the parameters width, offset, and length may vary regularly during sliding-window computation of a characteristic value for a data object. The values for the parameters may be varied, in alternative implementations. In certain distributed, differential electronic-data storage systems, multiple levels of routing may occur, with a data object first directed, by an initial routing step, to a particular group of component data-storage systems, and then subsequently routed to subgroups and finally to a particular component data-storage system.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for routing a data object, comprising a sequence of data units, to a particular component data-storage system, or particular group of component of data-storage systems, within a distributed, differential electronic-data storage system, the method comprising:

selecting one or more subsequences of data units from the data object;

computing one or more characteristic values from the selected subsequences;

computing one or more indexes from the one or more characteristic values; and directing the data object to the particular component data-storage system, or to the particular group of component data-storage systems, identified by the one or more computed indexes.

2. The method of claim 1 wherein selecting one or more subsequences of data units from the data object further includes:

selecting a window size;

selecting an offset; and selecting window-size subsequences of data-units from the data object, the window-size subsequences of data-units offset from one another by a number of data units equal to the selected offset.

3. The method of claim 2 wherein the selected offset is equal to the window size, resulting in selection of a consecutive sequence of contiguous, but non-overlapping data-unit subsequences from the data object.

4. The method of claim 2 wherein the selected offset is equal to 1, resulting in selection of a consecutive sequence of n grams from the data object, where n is equal to the window size.

5. The method of claim 2 further including:

selecting a length; and selecting up to a number of subsequences of data units from the data object equal to the selected length.

6. The method of claim 1 wherein computing one or more characteristic values from the selected subsequences further includes:

generating one or more values for each selected subsequence of data units; and computing one or more characteristic values from one or more of the one or more generated values.

7. The method of claim 6 wherein generating one or more values for each selected subsequence of data units further includes employing a hash function to generate a hash value from each of the selected subsequences.

8. The method of claim 6 wherein computing one or more characteristic values from one or more of the one or more generated values further includes one of:

computing one or more characteristic values by a numerical function that takes one or more generated values as arguments; and selecting one or more of the generated values as the one or more characteristic values.

9. The method of claim 8 wherein selecting one of the one or more generated values as the one or more characteristic values includes one of:

selecting one or more maximum-valued generated values of the generated values;

selecting one or more minimum valued generated values of the generated values;

selecting an average value of the generated values; and selecting a median value of the generated values.

10. The method of claim 1 wherein computing an index from the one or more characteristic values further includes combining, when there are multiple characteristic values, the two or more characteristic values to produce an integer, dividing the integer by the number of component data-storage systems, or groups of component data-storage systems, and selecting the remainder following integer division as the index.

11. Computer instructions encoded in a computer-readable medium that implement the method of claim 1.

12. A routing component of a distributed, differential electronic-data storage system that routes a data object, comprising a sequence of data units, to a particular component data-storage system, or particular group component data-storage systems, of the distributed, differential electronic-data storage system by:

selecting one or more subsequences of data units from the data object;

computing one or more characteristic values from the selected subsequences;

computing one or more indexes from the one or more characteristic values; and directing the data object to the particular component of the data-storage system, or to the particular group of component data-storage systems, identified by the one or more computed indexes.

13. The routing component of claim 12 wherein selecting one or more subsequences of data units from the data object further includes:

selecting a window size;

selecting an offset; and selecting window-size subsequences of data-units from the data object, the window-size subsequences of data-units offset from one another by a number of data units equal to the selected offset.

14. The routing component of claim 13 wherein the selected offset is equal to the window size, resulting in selection of a consecutive sequence of contiguous, but non-overlapping data-unit subsequences from the data object.

15. The routing component of claim 13 wherein the selected offset is equal to 1, resulting in selection of a consecutive sequence of n grams from the data object, where n is equal to the window size.

16. The routing component of claim 12 further including:

selecting a length; and selecting up to a number of subsequences of data units from the data object equal to the selected length.

17. The routing component of claim 12 wherein computing one or more characteristic values from the one or more selected subsequences further includes:

generating one or more values for each selected subsequence of data units; and computing one or more characteristic values from one or more of the one or more generated values.

18. The routing component of claim 17 wherein generating one or more values for each selected subsequence of data units further includes employing a hash function to generate a hash value from each of the selected subsequences.

19. The routing component of claim 17 wherein computing one or more characteristic values from one or more of the one or more generated values further includes one of:

computing the one or more characteristic values by a numerical function that takes one or more generated values as arguments; and selecting one or more of the generated values as the characteristic value.

20. The routing component of claim 12 wherein computing an index from the one or more characteristic values further includes combining, when there are multiple characteristic values, the two or more characteristic values to produce an integer, dividing the integer by the number of component data-storage systems, or groups of component data-storage systems, and selecting the remainder following integer division as the index.

* * * * *